United States Patent Office 2,798,054
Patented July 2, 1957

2,798,054
CELLULAR PHENOLIC RESIN PRODUCTS

Eli Simon, Los Angeles, and Frank W. Thomas, Burbank, Calif., assignors to Lockheed Aircraft Corporation, Burbank, Calif.

No Drawing. Application April 9, 1952, Serial No. 281,464

10 Claims. (Cl. 260—2.5)

This invention relates to cellular materials and relates more particularly to cellular phenolic resin products and to the methods of making the same.

Relatively low density cellular phenolic resin materials have been developed and introduced but so far as we are aware these products have been brittle and possessed poor physical strength characteristics. These attributes have, of course, prevented any appreciable acceptance of the materials for commercial or industrial applications, particularly where strength is a requirement. It is an object of the present invention to provide cellular phenolic resin products having good physical strength characteristics and, therefore, well suited for many applications for which the earlier products of this kind were inadequate and unsuited. The cellular products of this invention are strong and tough and, therefore, are useful in structural applications, etc. where they are required to serve as load carriers and where they may be called upon to withstand impact.

It is another object of our invention to provide cellular phenolic resin products that have substantially uniform cell structures and that do not develop voids or cracks upon setting and curing. The earlier cellular phenolic products were often of irregular cellular structure with large voids or internal cavities which of course weakened them and sometimes developed cracks or substantial discontinuities when they set up and cured. These imperfections made the products unsuitable for most applications. On the other hand the products of this invention are of substantially uniform cellular structure and may be made in large bodies or masses without the development of cracks or discontinuities.

A further object of the invention is to provide cellular plastic products of the kind described that are of low or relatively low density and yet are strong and tough to be well suited for use in aircraft and in industrial applications where relatively low weight coupled with substantial strength are important considerations.

Other objects and features of our invention will become apparent from the following specification or description.

In preparing the foamed or cellular plastic products we employ a suitable or selected phenol-aldehyde resol, a polyamide or protein or a formalized polyamide or protein, a gassing agent and an acid catalyst. Other ingredients such as polyvinyl alcohol may also be incorporated in the formulations and blends or mixtures of selected phenol-aldehyde resols may be used.

The phenol-aldehyde resol or resols employed are primarily derived from the reaction of phenols and aldehydes and their various analogues. Reference is made to our copending application, Serial No. 231,673, filed June 14, 1951 which specifically describes a large number of phenol-aldehyde resols suitable for use in preparing the products of the present invention. We will herein describe several typical examples of resols that are suitable for use in preparing the product or cellular material of this invention although we do not wish to be limited to these specific examples. The phenolic resins or phenol-aldehyde resols are acid catalyzable and water miscible, have a specific gravity of between 1.15 and 1.35 and a pH of about 7 and are the reaction products of a phenolic compound, an aldehyde and an alkaline catalyst. The following are illustrative formulations of the phenol-aldehyde resols suitable for incorporation in the reactant mixtures for making the cellular plastic products of the invention:

RESIN 1

Phenol _____ 1 mol.
Formaldehyde _____ 1 to 2.5 mols.
Barium hydroxide $8H_2O$ _____ 0.003 to 0.020 mol.

RESIN 2

Para-isopropyl phenol _____ 1 mol.
Formaldehyde _____ 1 to 2.5 mols.
Calcium carbonate _____ 0.003 to 0.020 mol.

RESIN 3

Phenol _____ } 1 mol total (the para-
Parachloro phenol _____ } chloro phenol being in the proportion of from 5 to 75% by mol weight).
Formaldehyde _____ 1 to 2.5 mols.
Barium hydroxide $8H_2O$ _____ 0.003 to 0.020 mol.

RESIN 4

Phenol _____ 1 mol.
Formaldehyde _____ } 1 to 2.5 mols total (the
Furfural _____ } furfural being in the proportion of from 5 to 50% by mol weight).
Barium hydroxide $8H_2O$ _____ 0.003 to 0.20 mol.

RESIN 5

Phenol _____ 1 mol.
Methyl ethyl ketone _____ 0.5 to 1 mol.
Formaldehyde _____ 1 to 2.5 mols.
Barium hydroxide $8H_2O$ _____ 0.003 to 0.020 mol.

RESIN 6

Phenol _____ 1 mol.
Formaldehyde _____ 1 to 2.5 mols.
Polyvinyl alcohol _____ 1 to 15% by weight of the total weight of the phenol and formaldehyde.
Barium hydroxide $8H_2O$ _____ 0.003 to 0.020 mol.

RESIN 7

Phenol _____ 1 mol.
Furfural _____ } 1 to 2.5 mols total (the fur-
Formaldehyde _____ } fural being in the proportion of from 5 to 50% by mol weight).
Polyvinyl alcohol _____ 5 to 50 grams.
Barium hydroxide $8H_2O$ _____ 0.003 to 0.020 mol.

RESIN 8

Phenol _____ }
Resorcinol _____ } 1 mol total (the resorcinol being in the proportion of from 5 to 75% by mol weight).
Formaldehyde _____ 1 to 2.5 mols.
Barium hydroxide $8H_2O$ _____ 0.003 to 0.020 mol.
Polyvinyl alcohol _____ 1 to 15 percent by weight of the combined weight of the other components.

The formaldehyde used in synthesizing the above phenol-aldehyde resols is preferably employed as an aqueous solution having a formaldehyde concentration of from 30 to 40% by weight and usually about 37% by weight. The phenol-aldehyde resols, such as above described, may be used separately or in selected blends or mixtures in preparing the reactant mixtures or formulations of the invention. The phenol-aldehyde resol, or a blend thereof, is used in the proportion of from about 68% to about 90% by weight of the total reactant mixture.

The catalyst which we prefer to employ is a blend or mixture of acids in aqueous solution although other acid catalysts may be used if desired. The blended acid catalyst which has been found to be especially effective in foaming the phenol-aldehyde resol and polyamide or protein mixture comprises a sulfonic acid, or the equivalent, and a phosphoric acid such as, n-metaphosphoric acid, pyro phosphoric acid, hexameta phosphoric acid, trimeta phosphoric acid and dimeta phosphoric acid. The phosphoric acid serves to control the cure rate of the foamed resinous mass. The sulfonic acids or sulfonic acid derivatives that may be employed in this catalyst blend include benzene sulfonic acid, phenol sulfonic acid, meta-benzene di-sulfonic acid, and toluene sulfonic acid. The catalyst may include, for example:

Catalyst

| | Percent by weight |
|---|---|
| Benzene sulfonic acid | 20 |
| Orthophosphoric acid (85% by weight concentration in an aqueous solution) | 45 |
| Water | 35 |

The benzene sulfonic acid, or the equivalent thereof, the phosphoric acid solution and the water of the catalyst may be employed in the proportion ranges of:

| | Catalyst | | | | |
|---|---|---|---|---|---|
| | a | b | c | d | e |
| benzene sulfonic acid (or equivalent)___percent__ | 20 | 20 | 20 | 5 | 50 |
| 85% aqueous orthophosphoric acid_____do___ | 10 | 45 | 70 | 75 | 25 |
| water_____do___ | 70 | 35 | 10 | 20 | 25 |

The acid catalyst blend, together with the gassing agent, assures the controlled rise of the phenolic resin mass and assists in producing the desirable physical strength characteristics of the resultant cellular products. The catalyst serves to liberate or generate hydrogen, nitrogen, carbon dioxide, or other gas to produce the foaming of the resin mass and also acts to effect a cure of the cellular or foamed resin. The concentration range of the catalyst mixture or blend is preferably from 2.0 to 35 parts by weight per 100 parts of the resin.

Other catalysts that may be used in the formulations of the invention in place of the above described catalyst include aqueous solutions of:

- p-Toluene sulfonic acid
- Benzene sulfonic acid
- Butyl sulfonic acid
- Camphor sulfonic acid
- Benzene m-disulfonic acid
- Beta-naphthalene sulfonic acid These may be employed in the proportion range of the previously described catalyst.

The gassing agent or agents used in preparing the cellular phenolic products may be metals such as aluminum, zinc, iron or magnesium in divided form or a water-soluble substance that will evolve gas while in contact with the water soluble sulfonic acid. Aluminum, zinc, iron or magnesium, preferably in atomized form of from 600 to 200 mesh, employed individually or in suitable mixtures, are effective as gassing agents as are these metals in the form of leafing powders of the same or comparable mesh. Sodium bicarbonate, potassium bicarbonate, lithium bicarbonate, sodium carbonate, potassium carbonate, lithium carbonate, ammonium carbonate, sodium nitrite, potassium nitrite, etc. may be used as the gassing agent in place of the divided metal or metals just mentioned. It is usually preferred to employ the desired divided metal or metals as they have been found to produce superior results. The gassing agent is used in the proportion of from .05 to 5.0% by weight of the total mixture.

We have discovered that the use or inclusion of synthetic polyamides or natural proteins in the reactant phenol-aldehyde resol foaming mixture results in or produces a cellular plastic product that is tough and that possesses superior physical strength characteristics. The polyamide or protein thus employed is soluble in and copolymerizable with the phenolic resol, the preferred method of incorporation being by rapid agitation in the hot resol, preferably at less than 200° F., the resin additives being finely divided. The polyamide or protein may be formalized either by the reaction of the same with the formaldehyde contained in the phenol-aldehyde resol or by treating or reacting the polyamide or protein with aqueous formaldehyde, formaldehyde vapor or a polymerized formaldehyde such as trioxymethylene or para-formaldehyde prior to blending or mixing it with the phenol-aldehyde resol. Where formaldehyde is used to pre-treat the polyamide or protein, it is preferably in the form of an aqueous solution of from 30 to 36% concentration by weight. In pre-formalizing the proteins or polyamides from 0.01 to 5% of the formaldehyde is used with from 99.99% to 95% by weight of the protein or polyamide, the preferred proportion being about 2% by weight of the formaldehyde solution to 98% by weight of the selected protein or polyamide. The pre-treatment or pre-formalizing of the proteins has been found to improve the viscosity of the mixture and to assist in producing a tougher, stronger cellular plastic product. The polyamides or proteins or the pre-formalized polyamides or proteins may be used singly or in combinations or blends to modify the phenol-aldehyde resol with a total range of proportions of from 2 to 20% of the total mixture. The proteins that may be used individually or in blends or mixtures in preparing the products of the invention include:

- Casein
- Dried blood
- Gelatine
- Hide glue
- Dried milk
- Zein
- Egg albumin
- Gliadin
- Hordein
- Keratin
- Lactalbumin
- Soyabean protein
- Peanut protein The polyamides used in the present formulations for preparing the cellular phenolic products are the reaction products of certain dibasic acids with diamines. The reaction of adipic acid with hexamethylene diamine is typical, producing a polyamide of the characteristic structure:

Polyamide 1

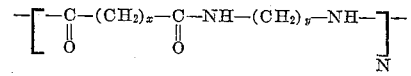

where $x=4$ and $y=6$ for the hexamethylene adipamide unit. Other acids that are useful in the preparation of the polyamides include malonic, succinic, glutaric, pimelic, suberic, sebacic, and azelaic. Other polyamides useful in synthesizing the polyamides are propylene diamine, 1,3 diamino butane, trimethylene diamine, tetramethylene diamine, pentamethylene diamine, decamethylene diamine, etc; di-secondary hexamethylene diamines such as (N,N' diisobutyl hexamethylene diamine); and secondary-primary diamines such as n-monoisobutyl hexamethylene diamine. The polyamides suitable for incorporation in the formulations and reaction products of the present invention include those described in the W. H. Carothers Patent Number 2,130,523, September 20, 1938, and the fusibility and solubility (necessary attributes of the polyamides employed in the present invention) of the polyamides are obtained and controlled by selecting the reacting components so that the sum of the radical lengths exceeds eight, the radical length in each case being the number of atoms in the chain of the radical. The polyamides have recurring structural units of unit length exceeding eight, with the nitrogens in the polyamide attached to aliphatic carbon atoms. Thus the radical length of the hexamethylene adipamide unit is 14 and is determined as follows:

$$-\underset{\underset{1}{H}}{N}-\underset{2}{CH_2}-\underset{3}{CH_2}-\underset{4}{CH_2}-\underset{5}{CH_2}-\underset{6}{CH_2}-\underset{7}{CH_2}-\underset{\underset{8}{H}}{N}-\underset{\underset{9}{\overset{O}{\|}}}{C}-\underset{10}{CH_2}-\underset{11}{CH_2}-\underset{12}{CH_2}-\underset{13}{CH_2}-\underset{\underset{14}{\overset{O}{\|}}}{C}-$$

The following are illustrative of other polyamides that may be employed in preparing the reaction products of the invention:

Polyamide 2

The reaction product of azelaic acid and tetramethylene diamine.

Polyamide 3

The reaction product of glutaric acid and decamethylene diamine.

Polyamide 4

The reaction product of dodecamethylene dicarboxylic acid and pentamethylene diamine.

Polyamide 5

The reaction product of hexadecamethylene dicarboxylic acid and pentamethylene diamine.

Polyamide 6

The reaction product of sebacic acid and decamethylene diamine.

In each of the polyamide examples given the reactants (the dibasic acids and diamines) are used in chemically equivalent amounts.

The following are illustrative examples of formulations for preparing or making the cellular phenolic resin products of the invention, the ingredients being given in percentages by weight:

EXAMPLE 1

| | Percent |
|---|---|
| Phenol-aldehyde resin No. 1 | 85 |
| Polyamide No. 1 | 5 |
| Catalyst | 9.7 |
| Aluminum powder | 0.3 |

In this example the proportion of the resin or resol may be from 70 to 88% with the polyamide in the proportion of from 2 to 20%.

EXAMPLE 2

| | Percent |
|---|---|
| Phenol-aldehyde resin No. 1 | 80 |
| Polyamide No. 4 | 5 |
| Polyvinyl alcohol | 5 |
| Catalyst | 9.7 |
| Aluminum powder, 422 mesh | 0.3 |

In Example 2 the resol may be employed in the proportion of from 68 to 86%; the polyvinyl alcohol may be used in the proportion of from 2 to 10%.

EXAMPLE 3

| | Percent |
|---|---|
| Phenol-aldehyde resin No. 1 | 70 |
| Phenol-aldehyde resin No. 7 | 5 |
| Polyamide No. 3 | 10 |
| Polyvinyl alcohol | 5 |
| Catalyst | 9 |
| Zinc powder, 300 mesh | 1 |

In Example 3 the phenol-aldehyde resin No. 1 may be used in the proportion of from 66% to 84% with the phenol-aldehyde No. 7 used in the proportion of from 2 to 5%.

EXAMPLE 4

| | Percent |
|---|---|
| Phenol-aldehyde resin No. 6 | 85 |
| Protein glue (hide glue) | 5 |
| Catalyst | 8 |
| Sodium bicarbonate | 2 |

In this example the proportion of phenolic resin No. 1 may range from 70% to 88% with the amount of protein glue ranging from 2% to 20%.

EXAMPLE 5

| | Percent |
|---|---|
| Phenol-aldehyde resin No. 1 | 85 |
| Protein (dried milk) | 5 |
| Catalyst | 9.7 |
| Aluminum powder, 400 mesh | 0.3 |

In Example 5 the phenol-aldehyde resin may be used in the amount of from 70% to 88% with the protein varying in amount from 2% to 20%.

EXAMPLE 6

| | Percent |
|---|---|
| Phenol-aldehyde resin No. 1 | 85 |
| Protein (dried blood) | 5 |
| Catalyst | 8.5 |
| Iron Powder, 400 mesh | 1.5 |

In Example 6 the resin may be employed in the proportion of from 70% to 88% and the protein may be used in the proportion of from 2 to 20%.

In each of the examples the polyamide or protein may, if desired, be used in the proportion of from 2% to 20%.

If desired or found more practical, the previously described pre-formalized proteins may replace the polyamides in Examples 2 and 3. In the following Examples 7, 8 and 9, the pre-formalized polyamides are specified, it being understood that other and equivalent polyamides treated or reacted with formaldehyde or its homologues, may be employed instead of those specified with the protein reacted with from 0.01% to 5% by weight of formaldehyde or its homologue with 2% by weight of the formaldehyde being preferred.

EXAMPLE 7

| | Percent |
|---|---|
| Phenol-aldehyde resin No. 1 | 80 |
| Formalized polyamide No. 1 | 10 |
| Catalyst | 9 |
| Aluminum powder, 400 mesh | 0.3 |
| Zinc powder, 400 mesh | 0.7 |

In Example 7 the resin may be used in the proportion of from 70% to 88% and the polyamide in the proportion of from 2 to 20%.

EXAMPLE 8

| | Percent |
|---|---|
| Phenol-aldehyde resin No. 2 | 85 |
| Formalized casein | 5 |
| Catalyst | 9.7 |
| Aluminum powder, 400 mesh | 0.3 |

In this example the resin may be used in the proportion of from 70% to 88% and the pre-formalized casein in the proportion of from 2 to 20%.

EXAMPLE 9

| | Percent |
|---|---|
| Phenol-aldehyde resin No. 1 | 88 |
| Formalized zein protein | 2 |
| Catalyst | 9.5 |
| Aluminum powder, 400 mesh | 0.5 |

In this case the resin may be employed in the proportion of from 70% to 88% and the pre-formalized zein in the proportion of from 2 to 20%.

In the above examples the catalyst is preferably the benzene sulfonic acid-orthophosphoric acid-water catalyst previously described, although the other catalysts enumerated above may be used in place thereof. Where polyvinyl alcohol is included in the above examples it is used to modify the phenol-aldehyde resol and may be replaced by polyvinyl alcohol chloride or by a combination of polyvinyl alcohol and polyvinyl alcohol chloride to the extent specified in the examples.

In preparing the cellular phenolic resin products of the invention the selected resol(s) are first heat-blended with the protein or polyamide, and upon cooling, the other components with the exception of the catalyst are incorporated and thoroughly mixed together to form a one "package" mixture. The catalyst constitutes the other component or "package." When it is desired to prepare and apply or pour the foamed product the "packages" or components just described are thoroughly mixed together and the resultant reactant mixture is then applied by pouring, brushing, blading, dipping, or the like. The mixture foams and reacts at atmospheric pressure and room temperatures to produce the cellular product, the reaction being accompanied by exothermic heat which sets the foam or cellular mass. The product may be post cured for several hours at a slightly elevated temperature, say at a temperature of from 150° F. to 250° F.

It should be understood that the invention is not to be based upon or dependent upon the theories which we have expressed. Nor is the invention to be regarded as limited to the express procedure or material set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissible in view of the prior art.

We claim:

1. The cellular plastic material which is the product of reaction of a foaming composition comprising, on an approximate percentage by weight basis; from 68% to 90% of an acid catalyzable water miscible phenol-aldehyde resol, an aqueous blend of from 5 to 50% benzene sulfonic acid, from 10 to 75% of an 85% concentration of orthophosphoric acid in an aqueous solution and from 10 to 70% water, said blend being in the proportion of from 2 to 35 parts by weight for each 100 parts by weight of the resol, from 0.05% to 5% of a gassing agent selected from the class consisting of finely divided aluminum, finely divided iron, finely divided zinc and finely divided magnesium, and from 2% to 20% of the reaction product of chemically equivalent amounts of glutaric acid and decamethylene diamine.

2. The cellular plastic material which is the product of reaction of a foaming composition comprising, on an approximate percentage by weight basis; from 68% to 90% of an acid catalyzable water miscible phenol-aldehyde resol, an aqueous blend of from 5 to 50% benzene sulfonic acid, from 10 to 75% of an 85% concentration of orthophosphoric acid in an aqueous solution and from 10 to 70% water, said blend being in the proportion of from 2 to 35 parts by weight for each 100 parts by weight of the resol, from 0.05% to 5% of a gassing agent selected from the class consisting of finely divided aluminum, finely divided iron, finely divided zinc and finely divided magnesium, and from 2% to 20% of the reaction product of chemically equivalent amounts of dodecamethylene dicarboxylic acid and penta methylene diamine.

3. A cellular plastic material which is the product of reaction of a foaming flowable composition comprising on a percentage by weight basis from about 68% to 90% of an acid catalyzable water miscible phenol-aldehyde resol, from 2% to 20% of a synthetic linear polycarbonamide predissolved in the resol the polycarbonamide being prepared from chemically equivalent amounts of a dibasic acid and a diamine, the dibasic acid being selected from the group consisting of adipic, malonic, succinic, glutaric, pimelic, suberic, sebacic and azelaic acids, and the diamine being selected from the group consisting of hexamethylene diamine, propylene diamine, 1,3 diamino butane, trimethylene diamine, tetramethylene diamine, pentamethylene diamine, decamethylene diamine, N,N diisobutyl hexamethylene diamine and n-monoisobutyl hexamethylene diamine, from 2 to 35 parts by weight per 100 parts by weight of the resol of an aqueous blend of sulfonic and orthophosphoric acids containing from 10 to 70% water, and from 0.05% to 5% of finely divided metal selected from the class consisting of aluminum, iron, zinc and magnesium.

4. A cellular plastic material which is the product of reaction of a foaming flowable composition comprising on a percentage by weight basis from about 68% to 90% of an acid catalyzable water miscible phenol-aldehyde resol, from 2% to 20% of a synthetic polycarbonamide prepared from chemically equivalent amounts of a dibasic acid and a diamine, the dibasic acid being selected from the group consisting of adipic, malonic, succinic, glutaric, pimelic, suberic, sebacic and azelaic acids, and the diamine being selected from the group consisting of hexamethylene diamine, propylene diamine, 1,3 diamino butane, trimethylene diamine, tetramethylene diamine, pentamethylene diamine, decamethylene diamine, N,N diisobutyl hexamethylene diamine and n-monoisobutyl hexamethylene diamine, from 2 to 35 parts by weight per 100 parts by weight of the resol of an aqueous blend of sulfonic acid and orthophosphoric acid, from 0.05% to 5% of a finely divided metal selected from the class consisting of aluminum, iron, zinc and magnesium.

5. The cellular plastic material which is the product of reaction of a foaming composition comprising, on an approximate percentage by weight basis; from 68% to 90% of an acid catalyzable water miscible phenol-aldehyde resol, from 2% to 20% of a synthetic linear polycarbonamide predissolved in the resol and being prepared from chemically equivalent amounts of a dibasic acid and a diamine, the dibasic acid being selected from the group consisting of adipic, malonic, succinic, glutaric, pimelic, suberic, sebacic and azelaic acids, and the diamine being selected from the group consisting of hexamethylene diamine, propylene diamine, 1,3 diamino butane, trimethylene diamine, tetramethylene diamine, pentamethylene diamine, decamethylene diamine, N,N diisobutyl hexamethylene diamine and n-monoisobutyl hexamethylene diamine, the nitrogens in the polyamide being attached to aliphatic carbon atoms, an aqueous blend of from 5 to 50% benzene sulfonic acid, from 10 to 75% of an 85% concentration of orthophosphoric acid in an aqueous solution and from 10 to 70% water, said blend being in the proportion of from 2 to 35 parts by weight for each 100 parts by weight of the resol, and from 0.05% to 5% of a gassing agent selected from the class consisting of finely divided aluminum, finely divided iron, finely divided zinc and finely divided magnesium.

6. The cellular plastic material which is the product of reaction of a foaming composition comprising, on an approximate percentage by weight basis; from 68% to 90% of an acid catalyzable water miscible phenol-aldehyde resol, from 2% to 20% of the reaction product of chemically equivalent amounts of adipic acid and hexamethylene diamine, said reaction product being predissolved in the resol, an aqueous blend of from 5 to 50% benzene sulfonic acid, from 10 to 75% of an 85% concentration of orthophosphoric acid in an aqueous solution and from 10 to 70% water, said blend being in the proportion of from 2 to 35 parts by weight for each 100 parts by weight of the resol, from 0.05% to 5% of a gassing agent selected from the class consisting of finely divided aluminum, finely divided iron, finely divided zinc and finely divided magnesium.

7. The cellular plastic material which is the product of reaction of a foaming composition comprising, on an approximate percentage by weight basis 85% of an acid catalyzable water miscible phenol-aldehyde resol, 5% of the reaction product of chemically equivalent amounts of adipic acid and hexamethylene diamine, said reaction product being predissolved in the resol, 9.7% of an aqueous blend of benzene sulfonic acid and orthophosphoric acid, and from 0.05 to 5% of aluminum powder.

8. The cellular plastic material which is the product of reaction of a foaming composition comprising on a percentage by weight basis; from about 68 to about 90% of an acid catalyzable water miscible phenol-aldehyde resol, about 5% of a synthetic linear polycarbonamide predissolved in the resol, the polycarbonamide being prepared from chemically equivalent amounts of a dibasic acid and a diamine, the dibasic acid being selected from the group consisting of adipic, malonic, succinic, glutaric, pimelic, suberic, sebacic and azelaic acids, and the diamine beng selected from the group consisting of hexamethylene diamine, propylene diamine, 1,3 diamino butane, trimethylene diamine, tetramethylene diamine, pentamethylene diamine, decamethylene diamine, N,N diisobutyl hexamethylene diamine and n-monoisobutyl hexamethylene diamine, from 2 to 35 parts by weight per 100 parts by weight of the resol of a catalyst comprising from 10 to 70% water, from 10 to 75% of an 85% aqueous acid solution prepared from a phosphoric acid; pyro phosphoric acid; hexameta phosphoric acid; trimeta phosphoric acid and dimeta phosphoric acid and from 5 to 50% of a sulfonic acid selected from the group consisting of benzene sulfonic acid; phenol sulfonic acid; meta benzene di-sulfonic and toluene sulfonic acid, and from 0.05 to 5% of a finely divided metal selected from the class consisting of aluminum; iron; zinc; and magnesium.

9. The cellular plastic material which is the product of reaction of a foaming composition comprising on a percentage by weight basis; from about 68 to about 90% of an acid catalyzable water miscible phenolaldehyde resol, from 2 to 20% of a synthetic linear polycarbonamide predissolved in the resol, the polycarbonamide being prepared from chemically equivalent amounts of a dibasic acid and a diamine, the dibasic acid being selected from the group consisting of adipic, malonic, succinic, glutaric, pimelic, suberic, sebacic and azelaic acids, and the diamine being selected from the group consisting of hexamethylene diamine, propylene diamine, 1,3 diamino butane, trimethylene diamine, tetramethylene diamine, pentamethylene diamine, decamethylene diamine, N,N diisobutyl hexamethylene diamine and n-monoisobutyl hexamethylene diamine, from 2 to 35 parts by weight per 100 parts by weight of the resol of a catalyst comprising from 10 to 70% water, from 10 to 75% of an 85% aqueous acid solution prepared from a phosphoric acid selected from the group consisting of orthophosphoric acid; n meta phosphoric acid; pyro phosphoric acid; hexameta phosphoric acid; trimeta phosphoric acid and dimeta phosphoric acid and from 5 to 50% of a sulfonic acid selected from the group consisting of benzene sulfonic acid; phenol sulfonic acid; meta benzene di-sulfonic and toluene sulfonic acid, and from 0.05 to 5% of a finely divided metal selected from the class consisting of aluminum; iron; zinc; and magnesium.

10. The cellular plastic material which is the product of reaction of a foaming composition comprising on a percentage by weight basis; from about 68 to about 90% of an acid catalyzable water miscible phenol-aldehyde resol, from 2 to 20% of a synthetic linear polycarbonamide predissolved in the resol, the polycarbonamide being selected from the class whose members consist of the reaction products of substantially chemically equivalent amounts of: azelaic acid and tetra methylene diamine, glutaric acid and decomethylene diamine, dodecamethylene dicarboxylic acid and pentamethylene diamine, hexadecomethylene dicarboxylic acid and pentamethylene diamine, sebacic acid and decamethylene diamine, and adipic acid and hexamethylene diamine, from 2 to 35 parts by weight per 100 parts by weight of the resol of a catalyst comprising from 10 to 70% water, from 10 to 75% of an 85% aqueous acid solution prepared from a phosphoric acid selected from the group consisting of orthophosphoric acid; n meta phosphoric acid; pyro phosphoric acid; hexameta phosphoric acid; trimeta phosphoric acid and dimeta phosphoric acid and from 5 to 50% of a sulfonic acid selected from the group consisting of benzene sulfonic acid; phenol sulfonic acid; meta benzene di-sulfonic and toluene sulfonic acid, and from 0.05 to 5% of a finely divided metal selected from the class consisting of aluminum; iron; zinc; and magnesium.

References Cited in the file of this patent
UNITED STATES PATENTS

| | | |
|---|---|---|
| 2,323,831 | Menger et al. | July 6, 1943 |
| 2,328,398 | Roskosky | Aug. 31, 1943 |
| 2,373,401 | King | Apr. 10, 1945 |
| 2,394,993 | Gardner | Feb. 19, 1946 |
| 2,446,429 | Nelson | Aug. 3, 1948 |
| 2,471,230 | McKeever | May 24, 1949 |
| 2,561,999 | Stuck | July 24, 1951 |
| 2,582,228 | Brinkema | Jan. 15, 1952 |
| 2,608,536 | Sterling | Aug. 26, 1952 |
| 2,683,697 | Newell et al. | July 13, 1954 |